United States Patent
Mantha et al.

(10) Patent No.: US 7,454,223 B2
(45) Date of Patent: Nov. 18, 2008

(54) SYSTEM AND METHOD FOR MANAGING AVAILABLE UPLINK TRANSMIT POWER

(75) Inventors: Ramesh Mantha, Toronto (CA); Anthony Gerkis, Richmond Hill (CA)

(73) Assignee: Soma Networks, Inc., San Francisco, CA (US)

( * ) Notice: Subject to any disclaimer, the term of this patent is extended or adjusted under 35 U.S.C. 154(b) by 0 days.

(21) Appl. No.: 10/559,789

(22) PCT Filed: Jun. 3, 2004

(86) PCT No.: PCT/CA2004/000816

§ 371 (c)(1),
(2), (4) Date: Dec. 8, 2005

(87) PCT Pub. No.: WO2004/109950

PCT Pub. Date: Dec. 16, 2004

(65) Prior Publication Data

US 2006/0128412 A1    Jun. 15, 2006

(30) Foreign Application Priority Data

Jun. 9, 2003   (CA) ................................. 2431847

(51) Int. Cl.
 *H04B 7/00*  (2006.01)
 *H04Q 7/20*  (2006.01)
 *H01Q 11/12* (2006.01)
 *H04B 1/04*  (2006.01)

(52) U.S. Cl. ................. 455/522; 455/69; 455/574; 455/127.1; 455/127.2; 455/127.5

(58) Field of Classification Search ............... 455/522, 455/69, 574, 127.1, 127.2, 127.5
See application file for complete search history.

(56) References Cited

U.S. PATENT DOCUMENTS

| | | | | |
|---|---|---|---|---|
| 4,326,245 | A * | 4/1982 | Saleh ........................ 363/79 |
| 5,774,797 | A * | 6/1998 | Kawano et al. .......... 455/127.2 |
| 5,991,618 | A * | 11/1999 | Hall ......................... 455/425 |
| 6,484,041 | B1 * | 11/2002 | Aho et al. ................ 455/574 |
| 6,574,209 | B1 * | 6/2003 | Kosaka ................... 455/67.11 |
| 6,819,937 | B2 * | 11/2004 | Knuutila et al. .......... 455/522 |
| 7,106,569 | B2 * | 9/2006 | Liu et al. ................. 455/127.5 |
| 7,158,489 | B1 * | 1/2007 | Knuutila et al. ........... 370/318 |

FOREIGN PATENT DOCUMENTS

| | | | |
|---|---|---|---|
| EP | WO 00/01094 | * | 1/2000 |
| WO | 00/01094 A1 | | 1/2000 |
| WO | 2004/109950 A3 | | 12/2004 |

* cited by examiner

*Primary Examiner*—Matthew Anderson
*Assistant Examiner*—Wen W Huang
(74) *Attorney, Agent, or Firm*—Katten Muchin Rosenman LLP

(57) ABSTRACT

A system and method of determining the maximum uplink transmit power of a subscriber station from a remote base station where the subscriber station reports incidents of foldback in its radio to the base station. When the base station receives the report, it reduces the maximum uplink transmit power of the subscriber station. After a period of time lapses without any reports of foldback occurring, the base station increases the maximum uplink transmit power of the subscriber station.

16 Claims, 6 Drawing Sheets

SYSTEM AND METHOD FOR MANAGING AVAILABLE UPLINK TRANSMIT POWER

FIELD OF THE INVENTION

The present invention relates to the field of power control in wireless systems. More specifically, the present invention relates to determining at a base station estimates of the available uplink transmit power for each subscriber station communicating with that base station.

BACKGROUND OF THE INVENTION

In wireless networks, comprising at least one base station and a plurality of subscriber stations, where the network is subject to the "near-far" problem and/or the like, the base station is preferably involved with the management of the transmission power levels of each subscriber station. In general, permitting a subscriber station to transmit with more power allows that subscriber station to achieve a higher data rate, but can also interfere with the transmissions of other subscriber stations. The tradeoffs between overall network efficiency versus performance of a particular subscriber station need to be carefully managed.

In addition to network limits, each subscriber station is limited in its own maximum uplink transmit power by regulatory and/or hardware limits. If a subscriber station transmits at an uplink transmit power level higher than its rated uplink transmit power, non-linear effects in the transmitter's power amplifier can produce errors in the channel. Additionally, for health and safety reasons and for regulatory reasons to minimize adjacent channel interference, wireless devices are restricted in the amount of power that they can transmit with, and this amount is typically less than the maximum possible output of the subscriber station's power amplifier. For example, a fixed wireless transmitter operating at 1.9 MHz may be restricted, by regulation, to a maximum uplink transmit power of 30 dBm. As known to those of skill in the art, specialized circuitry in the subscriber station's power amplifier, typically referred to as "foldback circuitry", is often employed to limit outputted power and prevent the subscriber station from transmitting over-specification and/or outside of regulatory limits.

When the base station is responsible for admitting subscriber stations to a higher data rates, the base station needs to know how much available uplink transmit power (i.e., the difference between the maximum uplink transmit power and the current average uplink transmit power) is available for each subscriber station. The base station does not want to assign a data rate to the subscriber station that the subscriber station is unable to achieve due to an insufficient amount of available uplink transmit power. The base station can make an estimate of available uplink transmit power for a subscriber station by receiving reports of the current uplink transmit power uplink transmit power from that subscriber station. However, this estimate may not be accurate due to variations in the subscriber station's measurement due to operating temperatures in the circuitry, a lack of, or limited, calibration of circuitry in the subscriber station. Due to these inaccuracies, the base station may perceive that a subscriber station has more available uplink transmit power than is actually the case. As such, the base station may attempt to admit the subscriber station to a higher uplink data rate, requiring a higher uplink transmit power than the subscriber station can actually support, resulting in channel errors and a waste of network capacity.

To prevent this problem from occurring, it is typical to provide an uplink transmit power margin to the estimate of available uplink transmit power to account for variances in each subscriber station. However, providing too large an uplink transmit power margin results in a potentially lower maximum data rate for the subscriber station, while providing too small an uplink transmit power margin can result in communication link errors and a waste of network capacity. As such, it is desired to provide a system and method to determine more accurately the amount of available uplink transmit power available to a subscriber station in order to assign data rates to that subscriber station.

SUMMARY OF THE INVENTION

It is an object of the present invention to provide a novel system and method for managing uplink transmit power that obviates or mitigates at least some of the above-identified disadvantages of the prior art.

According to a first aspect of the present invention, there is provided a method of determining at a base station an estimate of the maximum available uplink transmit power of a subscriber station having a radio including foldback circuitry and maintaining that estimate at the base station, the method comprising:

transmitting a message from the subscriber station to the base station whenever an incident of foldback occurs at the subscriber station;

decreasing the maintained estimate of the maximum uplink transmit power of the subscriber station at the base station when the base station receives the message from the subscriber station; and increasing the maintained estimate at the base station when a predefined period of time has lapsed after the base station received the message.

According to another aspect of the present invention, there is provided a system for transmitting data comprising:

a plurality of subscriber stations each operable to transmit a message indicating an incident of foldback in the subscriber station; and a base station operable to maintain an estimate of the maximum available uplink transmit power for each the subscriber station and to receive any the messages from the plurality of subscriber stations and to reduce the maintained estimate for each the subscriber station which has sent any the message.

According to another aspect of the present invention, there is provided a system for transmitting data comprising:

at least one subscriber station operable to transmit data at a plurality of different data rates, the subscriber station further operable to transmit a message indicating an incident of foldback in the subscriber station; and a base station operable, upon receiving the message, to reduce the data rate for the subscriber station.

The present invention provides a system and method of determining and maintaining at a base station an estimate of the maximum available uplink transmit power of a subscriber station, where the subscriber station reports incidents of foldback in its radio to the base station. When the base station receives the report, it reduces the estimate of the maximum available uplink transmit power of the subscriber station to prevent channel errors. Typically, the base station will also reduce the data rate for the subscriber station. After a period of time lapses without any reports of foldback occurring at the subscriber station, the base station increases the estimate of the maximum available uplink transmit power of the subscriber station.

BRIEF DESCRIPTION OF THEY DRAWINGS

A present embodiment of the present invention will now be described, by way of example only, with reference to the attached Figures, wherein.

DETAILED DESCRIPTION OF THE INVENTION

Figure 1:
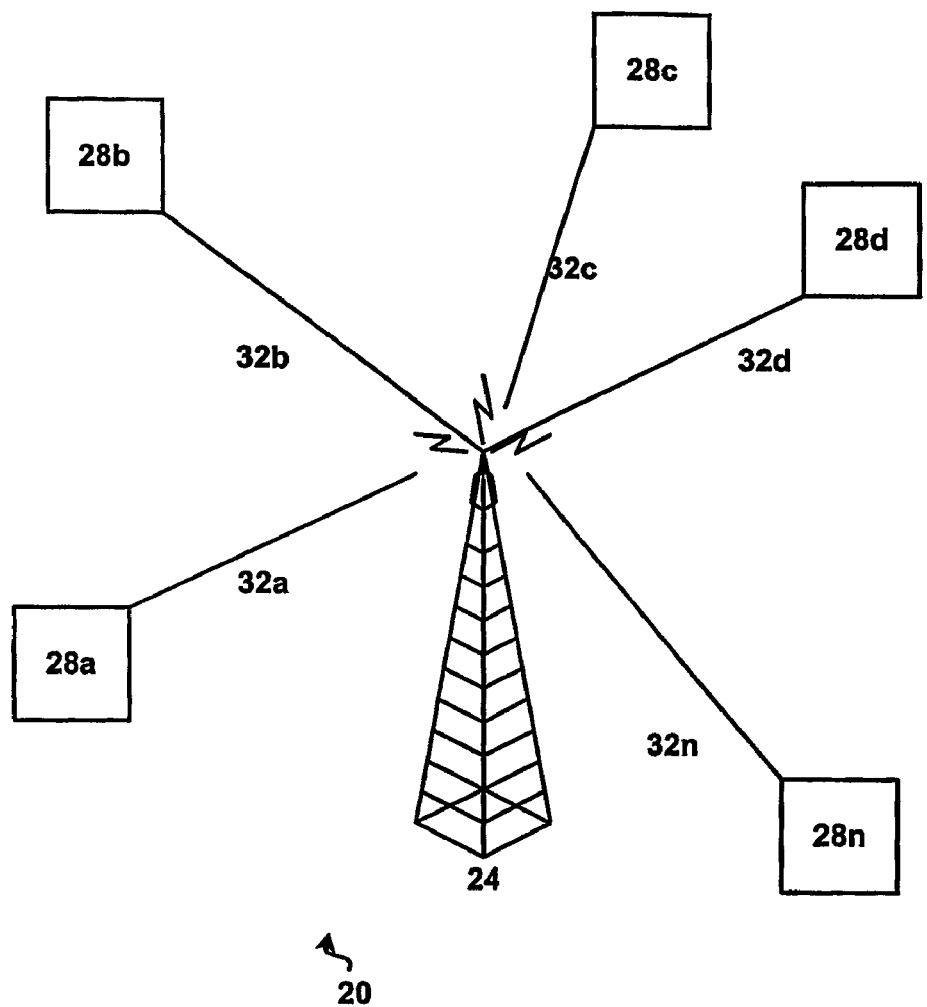
FIG. 1 is a schematic representation of a wireless network, in accordance with an embodiment of the invention, comprising a base station and a plurality of subscriber stations.

Referring now to FIG. 1, a wireless network for transmitting data is indicated generally at 20. Network 20 includes a radio base station 24 and a plurality of subscriber stations 28a, 28b ... 28n. In a presently preferred embodiment, radio base station 24 is connected to at least one data telecommunications network (not shown), such as a land line-based switched data network, a packet network, etc., by an appropriate gateway and one or more backhauls (not shown), such as a T1, T3, E1, E3, OC3 or other suitable land line link, or a satellite or other radio or microwave channel link or any other link suitable for operation as a backhaul as will occur to those of skill in the art.

Base station 24 communicates with subscriber stations 28 which, in a present embodiment of the invention, are installed at subscriber premises, as is common in a wireless local loop (WLL) system but could also be nomadic or mobile stations as will be apparent. The number 'n' of subscriber stations serviced by a base station 24 can vary depending upon a variety of factors, including the amount of radio bandwidth available and/or the configuration and requirements of the subscriber stations 28.

As illustrated in FIG. 1, the geographic distribution of subscriber stations 28 with respect to base station 24 need not be symmetric nor will subscriber stations 28 which are physically located close to one another necessarily experience the same or similar reception qualities due to a variety of factors including the geographic environment (the presence or absence of buildings which can reflect or mask signals), the radio environment (the presence or absence of radio noise sources), etc. and inherent radio propagation properties, such as Rayleigh fading, etc. Thus, in most circumstances individual subscriber stations 28 served by a base station 24 will have significantly different reception and transmission qualities from other subscriber stations 28 served by base station 24 and these qualities will change over time.

As known to those of skill in the art, subscriber stations 28 can be geographically divided into different radio sectors formed via beam forming antennas at base station 24 to increase the number of subscriber station 28 that can be served from a single base station location. In such a case, each sector essentially acts as a different base station and base station 24 can manage the network resources in each sector independent of each other sector. While FIG. 1 shows only one base station 24 with a single sector, it will further be apparent to those of skill in the art that network 20 can contain multiple, geographically distributed base stations 24, with overlapping sector coverage of subscriber stations 28, and where each subscriber station 28 in an overlapping sector coverage area can select which base station 24, or base stations, it will be served by.

A communication link 32 is established between base station 24 and each subscriber station 28 via radio. Communication link 32a carries information to be transferred between base station 24 and subscriber station 28a, communication link 32b carries information to be transferred between base station 24 and subscriber stations 28b, etc. Communication links 32 can be implemented using a variety of multiple access techniques, including TDMA, FDMA, CDMA or hybrid systems such as GSM, etc. to obtain links 32a, 32b, etc. to respective subscriber stations 28a, 28b, etc. In a present embodiment, data transmitted over communication link 32 is transmitted using CDMA as a multiple access technology and the data is in the form of packets, encapsulated within slotted time frames.

As used herein, the terms "package", "packaged" and "packaging" refer to the overall arrangement of the transmission of the data for its reception at an intended destination receiver. Packaging of data can include, without limitation, applying different levels of forward error correcting (FEC) codes (from no coding to high levels of coding and/or different coding methods), employing various levels of symbol repetition, employing different modulation schemes (QPSK, 4-QAM, 16-QAM, 64-QAM, etc.) and any other techniques or methods for arranging data transmission with a selection of the amount of radio (or other physical layer) resources required for the data rate and the probability of transmission errors which are appropriate for the transmission. For example, data can be packaged with rate ¼ FEC coding (each 1 data bit is transmitted in 4 bits of information) and 16-QAM modulation for transmission to a first intended receiver and packaged with rate ½ FEC coding and 64-QAM modulation for transmission to a second intended receiver, which has a better reception-quality than the first.

Communications link 32 operates in both an uplink (from a subscriber station 28 to base station 24) and a downlink direction (from base station 24 to subscriber stations 28). The method of providing both uplink and downlink direction is not particularly limited, and in the present embodiment communications link 32 operates by frequency division duplexing (FDD). However, other methods of providing both an uplink and downlink direction, such as time division duplexing (TDD) and hybrids thereof are within the scope of the invention.

Figure 2:
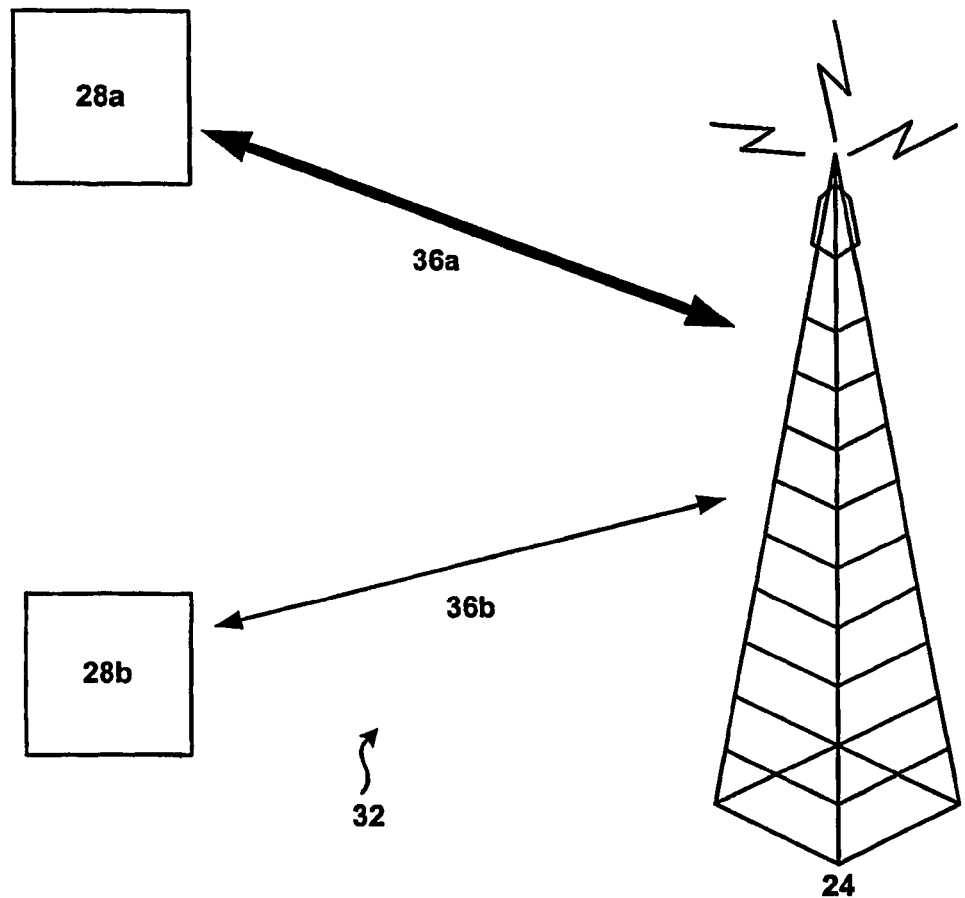
FIG. 2 is a representation of a communications link as shown in FIG. 1, comprised of channels having different capacities.

Referring now to FIG. 2, communications link 32 is comprised of a plurality of channels that can be downlink channels, uplink channels or bi-directional channels. In the present CDMA implementation, channelization of the downlink of communications link 32 is achieved with orthogonal coding of link 32. In the current embodiment, dedicated data channels (DDCHs) 36 are used as an uplink from subscriber stations 28 to base station 24 and are used to carry latency-sensitive traffic in the downlink from base station 24 to subscriber stations 28. A broadcast data channel, not shown, can also be employed in the downlink direction to transmit data that is less latency sensitive. DDCHs 36 can be appropriately sized, in both the uplink and downlink directions, to provide a variety of data rates over varying reception qualities experienced at a subscriber station 28, as needed. For example, DDCH 36a between base station 24 and subscriber station 28a can be sized to provide a higher data rate than DDCH 36b between base station 24 and subscriber station 28b.

Figure 3:
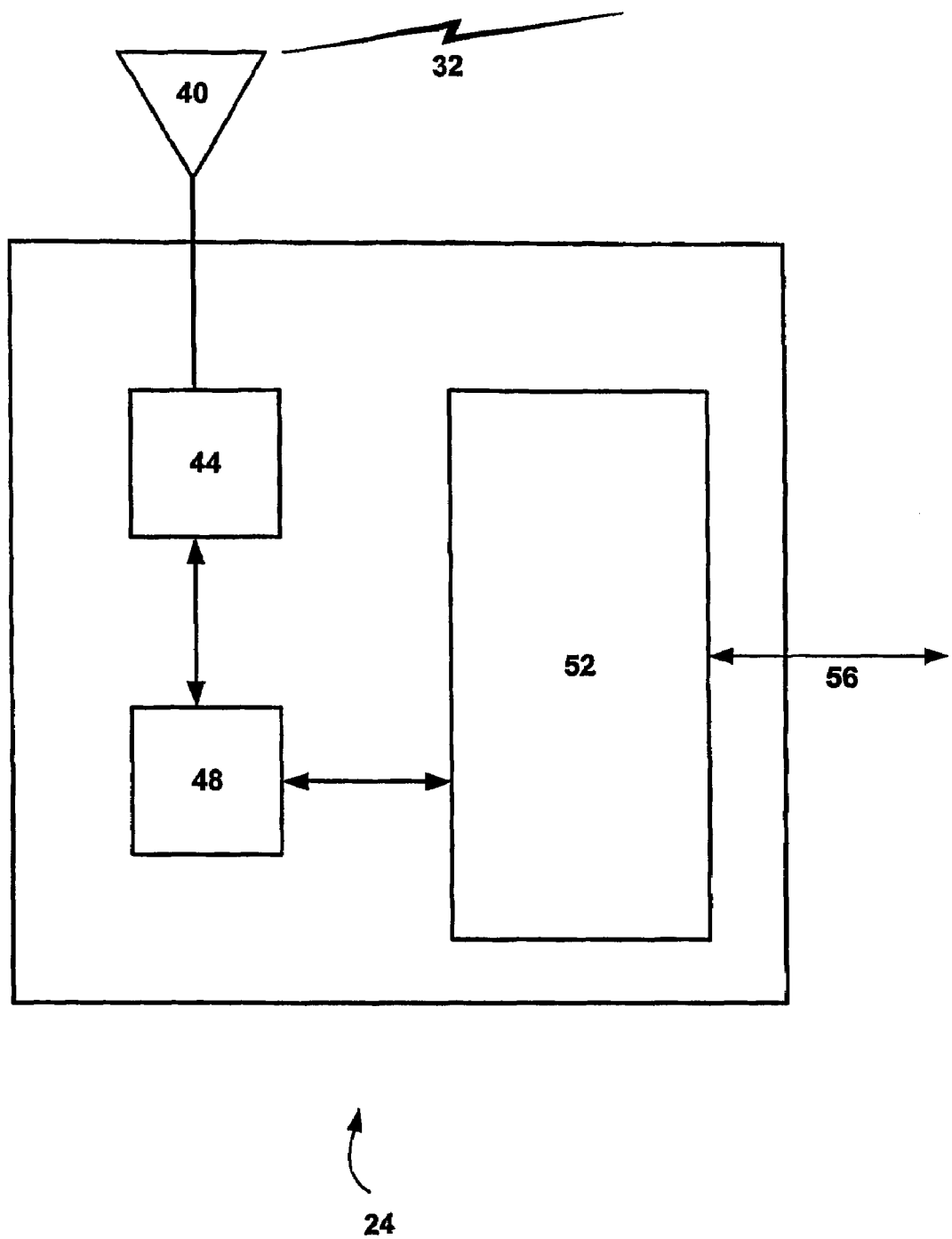
FIG. 3 is a schematic representation of the base station shown in FIG. 1.

FIG. 3 shows an example of a base station 24 in greater detail. For the sake of clarity, FIG. 3 shows an example of a single sector base station 24. However, as described above, multi-sector base stations 24 are also within the scope of the invention. Base station 24 comprises an antenna 40, or antennas, for receiving and transmitting radio-communications over communication communications link 32. Antenna 40 is connected to a radio 44 and a modem 48. Modem 48 is connected to a microprocessor-router assembly 52 such as a Pentium III processor system manufactured by INTEL.

Microprocessor-router assembly 52 is responsible for radio resource management of all subscriber stations 28 within its sector 36. It will be understood that assembly 52 can include multiple microprocessors, as desired and/or that the router can be provided as a separate unit, if desired. The router within microprocessor-router assembly 52 is connected to a backhaul 56 in any suitable manner, which in turn connects base station 24 to a data telecommunications network (not shown).

Figure 4:
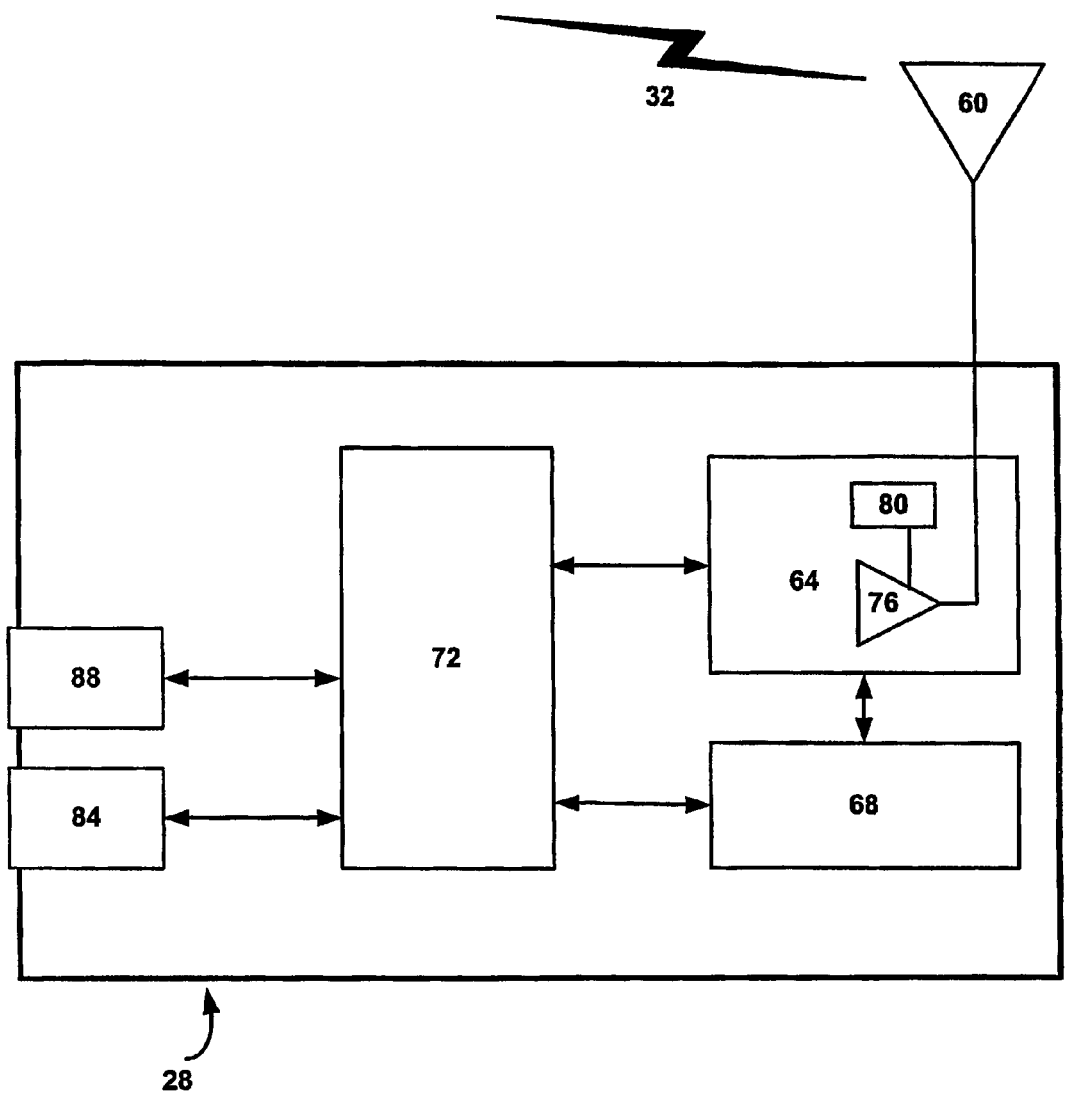
FIG. 4 is a schematic representation of one of the subscriber stations shown in FIG. 1.

Referring now to FIG. 4, an example of a subscriber station 28 is shown in greater detail. Subscriber station 28 comprises an antenna 60, or antennas, for receiving and transmitting radio-communications over communication communications link 32. Antenna 60 is connected to a radio 64 and a modem 68, which in turn is connected to a microprocessor-assembly 72. Radio 64 includes a power amplifier 76, operable to provide the desired uplink transmit power. Power amplifier 76 includes foldback circuitry 80 that monitors a current in power amplifier 76 indicative of the actual uplink transmit power provided to antenna 60, referred to hereinafter as the "monitored current". Foldback circuitry 80 operates to limit the monitored current to prevent power amplifier 76 from being driven over specification and/or outside regulatory limits. When foldback circuitry 80 operates to limit the monitored current, power amplifier 76 is referred to as being in a foldback condition. A foldback condition indicates that subscriber station 28 is at its maximum uplink transmit power and, as such, has no available uplink transmit power.

Microprocessor-assembly 72 can include, for example, a StrongARM or Xscale processor manufactured by Intel, that performs a variety of functions, including implementing A/D-D/A conversion, filters, encoders, decoders, data compressors, de-compressors and/or packet assembly/disassembly. Microprocessor-assembly 72 interconnects modem 68 with a data port 84, for connecting subscriber station 28 to a data client device (not shown), such as a personal computer, personal digital assistant or the like which is operable to use data received over communication communications link 32. Accordingly, microprocessor-assembly 72 is operable to process data between data port 84 and modem 68. Microprocessor-assembly 72 is also interconnected to at least one telephony port 88, for connecting subscriber station 28 to a telephony device (not shown) such as a telephone or facsimile machine.

A problem with prior art systems is that the base station's estimate of a subscriber station's available uplink transmit power is often inaccurate. As described earlier, temperature variations and a lack of sufficient calibration in a subscriber station's power amplifier will cause the power amplifier to potentially produce a different uplink transmit power than what is being reported. If a subscriber station has less available uplink transmit power than is estimated by the base station, the base station could instruct that subscriber station to move to a higher data rate (for example, by changing its modulation scheme from 32-QAM to 16-QAM) than the subscriber station could currently achieve. Foldback circuitry would prevent the subscriber station from being overdriven to achieve the desired data rate, resulting in transmission errors. Alternatively, a subscriber station could have more available uplink transmit power than is estimated by the base station. In this situation, the base station will not allow a subscriber station to achieve its highest possible data rate.

Figure 5:
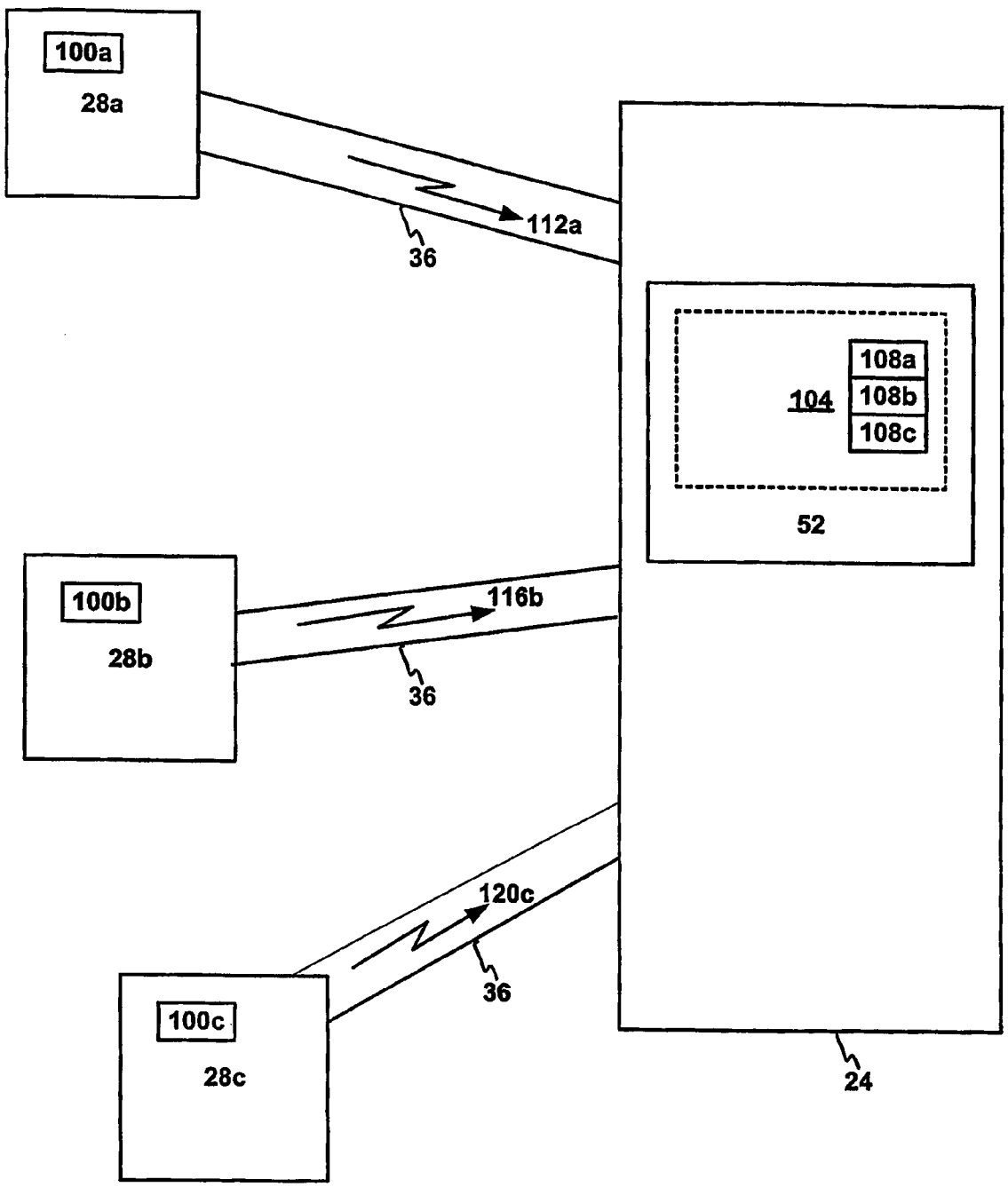
FIG. 5 is a representation of event messages transmitted between subscriber stations and a base station over the communications link shown in FIG. 2.

In contrast to the prior art, in the present invention, as part of its regular operations, each subscriber station 28 tracks incidents of foldback to provide a more accurate estimate to base station 24. Referring now to FIG. 5, each subscriber station 28 maintains a foldback record 100, which is stored on microprocessor-assembly 72. Each time foldback occurs foldback record 100 is updated. The information stored in foldback record 100 is not particularly limited and can include foldback information such as the number of consecutive frames in which foldback has occurred or the percentage of frames over a period of time in which foldback has occurred or both. Other foldback-related information that may be usefully stored in foldback record 100 will occur to those of skill in the art.

Within network 20, the allocation of radio resources is controlled by a radio resource allocation manager (RRAM) 104 which runs on microprocessor-assembly 52 of base station 24 or on any other appropriate computing resource within network 20. RRAM 104 is responsible for assigning and unassigning DDCHs 36 and for adjusting data rates in both the uplink and the downlink. The data rate assigned to a DDCH 36 can change over the course of its duration, based on the demands from subscriber station 28 and the amount of available resources within network 20. RRAM 104 tracks the date rates and other known operating values for each subscriber station 28 in a subscriber station record 108. For example, each subscriber station record 108 also stores both the maximum uplink transmit power ($P_{Max}$), and the current average uplink transmit power ($P_{Ave}$) of the subscriber station, as reported by subscriber station 28 to base station 24. Subscriber station record 108 also maintains a uplink transmit power margin ($\delta_H$) for each subscriber station 28 which is used in an attempt to correct for calibration and temperature-related variations in the maximum uplink transmit power. The uplink transmit power margin will be described in further detail below.

As part of its regular operations, subscriber station 28 transmits different kinds of messages to base station 24. These messages can be transmitted over DDCH 40 or over another channel if a DDCH 40 is not currently established between subscriber station 28 and base station 24.

One type of message transmitted periodically from each operating subscriber station 28 to base station 24 is a measurement report 112. Measurement reports 112 can include, among other things the received signal strength from base station 24 experienced at a subscriber station 28 and the $P_{Ave}$ for the subscriber station 28. Upon receiving a measurement report 112, RRAM 104 updates the values it has stored for the subscriber station 28 in a subscriber station record 108.

Another message transmitted from subscriber station 28 to base station 24 is a rate increase request 116. In the current embodiment, subscriber station 28 transmits a rate increase request 116 whenever it has a queue of data to be transmitted which has exceeds a preselected value, or in other words, data to be transmitted is being enqueued at some rate faster than the data is being transmitted. In response, RRAM 104 will determine whether or not it can move subscriber station 28 to a higher data rate by increasing the size of DDCH 40. RRAM 104 calculates the amount of available uplink transmit power ($\Delta P_{Available}$) for a subscriber station 28. If there is insufficient $\Delta P_{Available}$, then RRAM 104 will not able to increase the size of DDCH 40 and cannot admit subscriber station 28 to the higher data rate. As will be apparent to those of skill in the art, available uplink transmit power is only one criterion in attempting to admit subscriber station 28 to a higher uplink data rate, and other factors are also considered. Other such factors can include the management of total sector interference, Quality of Service (QoS) concerns, and other hardware limitations.

In the current embodiment, RRAM 104 determines available uplink transmit power using the following formula:

$$\Delta P_{Available} = P_{Max} - P_{Ave}$$

where $\Delta P_{Available}$ indicates the amount of available uplink transmit power for a subscriber station, $P_{Max}$ indicates the maximum uplink transmit power of subscriber station 28 and $P_{Ave}$ indicates the average uplink transmit power, as reported by subscriber station 28 and stored in subscriber station record 104.

As described earlier, the $P_{Max}$ of a subscriber station can vary considerably due to a lack of calibration and environmental variations. As such, an uplink transmit power margin ($\delta_H$) is applied so that power amplifier 76 is not driven out of its intended operating range. RRAM 104 determines the $P_{Max}$ of subscriber station 28 as follows:

$$P_{Max} = P_{SSmax} + \delta_H$$

where $P_{SSmax}$ indicates a predetermined maximum uplink transmit power for all subscriber stations 28. $P_{SSmax}$ is be the lower of the maximum rated power output of power amplifier 76 and a maximum rated power output set by regulators. In the present embodiment, $P_{SSmax}$ is defined as 25 dBm. $\delta_H$ indicates the current uplink transmit power margin applied to subscriber station 28. In a present embodiment, $\delta_H$ can range from a minimum of -3 dBm to a maximum of 6 dBm. Thus a subscriber station 28 with a predetermined $P_{SSmax}$ of 25 dBm having the maximum $\delta_H$ would be considered to have a $P_{Max}$ of 31 dBm for the purpose of determining $\Delta P_{Available}$. How RRAM 104 determines $\delta_H$ is described in greater detail below.

Another message transmitted from subscriber station 28 to base station 24 is a foldback event message 120. As described earlier, subscriber stations 28 track when power amplifier 76 is in a foldback condition. When the foldback value or values stored in foldback record 108 reach a predetermined threshold, a foldback event message 120 reporting an incident of foldback is transmitted to base station 24. This predetermined threshold can be adjusted by a network operator to account for different local network conditions and for different types of foldback. For example, a foldback event message 120 could be sent when foldback record 108 holds a value indicating that 25 or more consecutive frames have been subject to foldback. Another example would be if foldback record 108 holds a value indicating that at least 10% of all frames transmitted over a predefined period of time have been subject to foldback.

Figure 6:
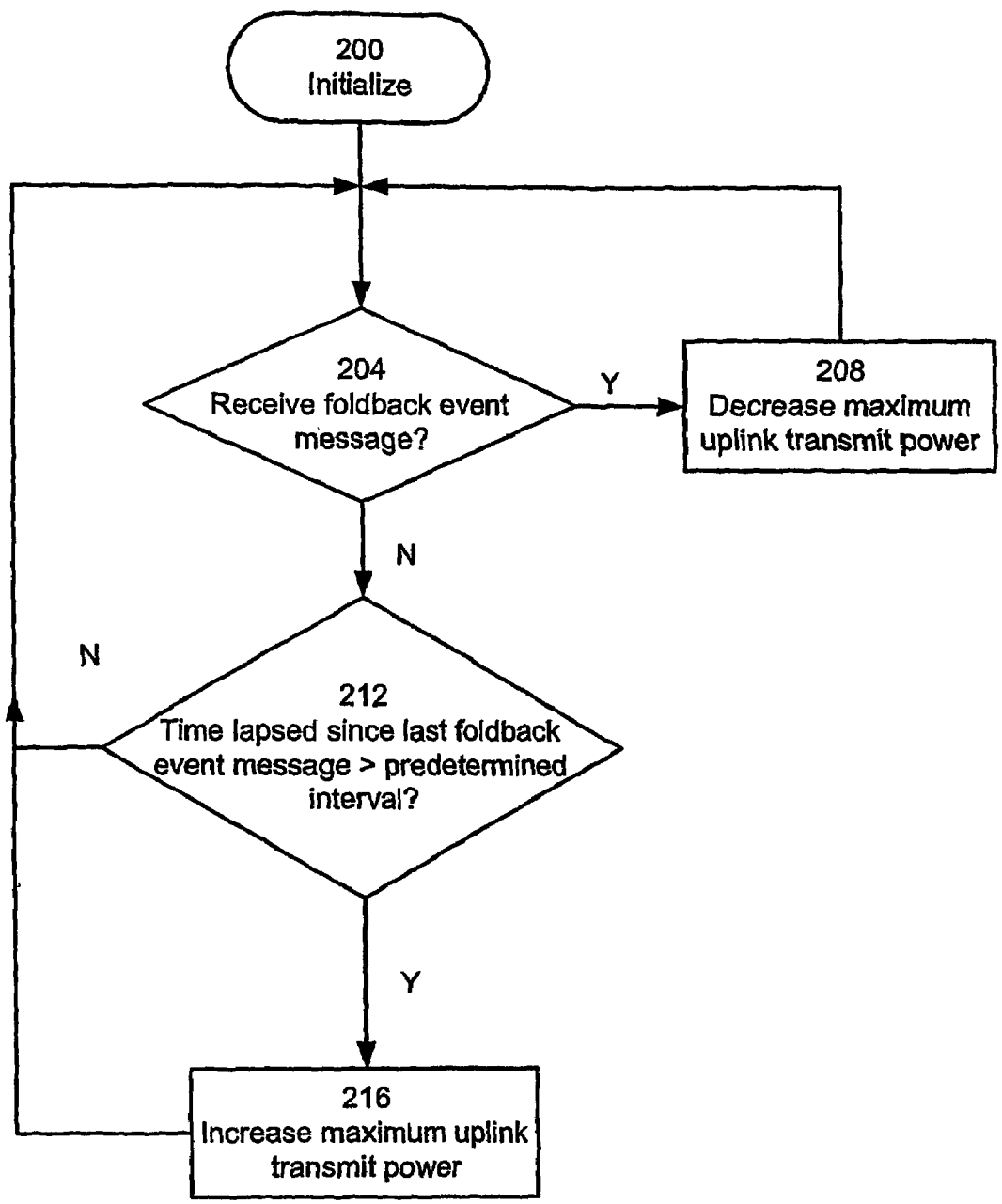
FIG. 6 is a flowchart showing how the base station determines an uplink transmit power margin for a subscriber station.

Referring now to FIG. 6, a method of determining at base station 24 the uplink transmit power margin ($\delta_H$) for a subscriber station 28 is shown beginning at step 200. The method of determining $\delta_H$ is a method that runs continuously within RRAM 104 for each subscriber station 28 served by base station 24. At step 200, the method commences with RRAM 104 initializing its subscriber station records 104, including the value for $\delta_H$. In the current embodiment, $\delta_H$ starts at a predetermined maximum value, such as 6 dBm, Using the initial value of $\delta_H$, RRAM 104 is able to determine the derived value of $P_{Max}$ using the formula described above. Step 200 occurs upon power-up of base station 24 or whenever a new subscriber station 28 joins network 20 and is to be serviced by base station 24.

At step 204, RRAM 104 checks to see if it receives a foldback event message 120 from subscriber station 28. If a foldback event messages 120 is received, the method advances to step 208. Otherwise the method advances to step 212.

At step 208, in response to the receipt of tile foldback event message 120, RRAM 104 decreases the uplink transmit power margin ($\delta_H$) value stored for that subscriber station 28. Provided that the value of $\delta_H$ is greater than the above-mentioned minimum value for $\delta_H$, the stored value of $\delta_H$ is reduced by a predetermined amount. In the current embodiment, this predetermined amount is 1 dBm. After reducing the value of $\delta_H$, RRAM 104 determines the revised value of $P_{Max}$. The method then returns to step 204.

If at step 204, no foldback event message 120 has been received, then at step 212, RRAM 104 determines whether a predetermined interval has lapsed at subscriber station 28 without any foldback event messages 120 being received. In a present embodiment, this predetermined interval is 30 minutes, although other predetermined intervals can be employed, as appropriate. If the predetermined interval has lapsed without any foldback event messages 120 being received then the method advances to step 216. Otherwise, the method returns to step 204.

At step 216, if the uplink transmit power margin ($\delta_H$) for subscriber station 28 is less than its maximum value (6 dBm in a present embodiment), then base station 24 increases $\delta_H$ for that subscriber station 28 by a fixed amount (1 dBm in a present embodiment). After increasing the value of $\delta_H$, RRAM 104 determines the revised value of $P_{Max}$ Once the uplink transmit power margin $\delta_H$ has been increased, the method returns to step 204.

While the above method contemplates adjusting $\delta_H$ by a predetermined increment of power, such as 1 dBm, the uplink transmit power margin can be adjusted in different increments. For example, if foldback event messages 120 are transmitted frequently (say, once a minute), then RRAM 104 could reduce $\delta_H$ by a larger increment, e.g. 2 dBm. Conversely, if foldback event messages 120 are being transmitted relatively infrequently (say, once every ten minutes), then RRAM 104 could reduce $\delta_H$ by a smaller increment, such as 0.5 dBm. Alternatively, subscriber station 28 can indicate the intensity of the foldback in foldback event message 120. In this case, RRAM 104 could reduce $\delta_H$ by an amount proportional to the intensity of the foldback condition in subscriber station 28.

As will undoubtedly be apparent to those of skill in the art, if subscriber station 28 transmits a foldback event message 120 to base station 24, then subscriber station 28 is already transmitting at its $P_{Max}$. RRAM 104 may determine that subscriber station 28 is transmitting at a higher date than its $P_{Max}$ can reliably support. As such, RRAM 104 may instruct subscriber station 28 to move to a lower data rate. It is also contemplated that subscriber station 28 could, without receiving instructions from base station 24, reduce its data rate on communications link 32, upon experiencing a foldback condition. For example, if the value in foldback record 100 indicates that least 15% of all frames transmitted over a predefined period of time have been subject to foldback, subscriber station 28 could automatically reduce its data rate on communications link 32. Subscriber station 28 would still send a foldback event message 120 to base station 24 so that base station 24 would be aware of both the foldback condition in subscriber station 28 and the changes being made to communications link 32. Other variations will occur to those of skill in the art.

By receiving foldback event messages 120 from subscriber station 28, RRAM 104 is able to determine a more accurate estimate of the available uplink transmit power for that subscriber station. Each time a foldback event message 120 is received, RRAM 100 decreases $\delta_H$, which as a result decreases $P_{Max}$ as well. By decreasing the value of $P_{Max}$, RRAM 100 reduces its estimate of $\Delta P_{Available}$ for subscriber station 28, ultimately resulting in fewer or no foldback events being reported. After a period of time with no foldback events being reported, RRAM 100 increases $\delta_H$ (thereby increasing the value of $P_{Max}$ and the estimate of $\Delta P_{Available}$). By continuously adjusting $\delta_H$ both up and down, RRAM 100 is able to achieve a more reliable estimate of $\Delta P_{Available}$. This more reliable estimate of $\Delta P_{Available}$ reduces the number of foldback events experienced by subscriber station 28, (thus reducing the number of link errors caused by subscriber station 28) and maximizes the maximum uplink transmit power available to subscriber station 28.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A method of increasing the accuracy of a base station's estimate of additional uplink transmit power available for a subscriber station that has a radio that includes a power amplifier including foldback circuitry that monitors a current in said power amplifier indicative of actual uplink transmit power provided by said power amplifier to an antenna, said foldback circuitry operating to limit said monitored current to prevent said power amplifier from being driven over specification or being driven outside regulatory limits, said method comprising:

maintaining at said base station an estimated value for allowable maximum uplink transmit power for said subscriber station;

tracking at said subscriber station incidents of foldback, an incident of foldback occurring whenever said foldback circuitry operates to limit said monitored current to prevent said power amplifier from being driven over specification or being driven outside regulatory limits;

transmitting a foldback event message from said subscriber station to said base station whenever incidents of foldback tracked at said subscriber station reach a predetermined threshold;

decreasing said estimated value when said base station receives a foldback event message from said subscriber station;

increasing said estimated value when a predetermined interval of time has lapsed without said base station receiving a further foldback event message from said subscriber station; and subtracting uplink transmit power reported by said subscriber station from said estimated value to estimate additional uplink transmit power currently available to said subscriber station, when an accurate estimate of said additional uplink transmit power is required.

2. The method of claim 1, wherein said base station increases said estimated value in increments of substantially 1 dBm.

3. The method of claim 1, wherein said base station decreases said estimated value in increments of substantially 1 dBm.

4. The method of claim 1, wherein said predetermined interval of time is substantially 30 minutes.

5. The method of claim 1, wherein said predetermined threshold is reached when a preselected number of consecutive frames have been subject to foldback.

6. The method of claim 1, wherein said predetermined threshold is reached when said subscriber station has a foldback duty cycle of more than a predetermined amount over a predetermined period of time.

7. The method of claim 1 wherein said foldback event message includes an indication of the intensity of foldback imposed at said subscriber station and said base station decreases said estimated value by an amount proportional to the intensity of foldback.

8. The method of claim 1, wherein the stored value for allowable maximum uplink transmit power is the sum of the lower of a maximum rated power output of the subscriber station and a maximum rated power output set by regulation and a stored uplink transmit power margin having a predetermined range of possible values, the stored value for allowable maximum uplink transmit power increased or decreased by increasing or decreasing the uplink transmit power margin within the predetermined range.

9. The method of claim 8, wherein the method commences when the base station powers up and whenever another subscriber station becomes serviced by the base station by initializing the stored uplink transmit power margin to a predetermined maximum value.

10. The method of claim 8, wherein the lower of a maximum rated power output of the subscriber station and a maximum rated power output set by regulation is substantially 25 dBm, and wherein the range of possible values of the uplink transmit power margin is substantially −3 dBm to substantially 6 dBm.

11. A system for transmitting data comprising:

a plurality of subscriber stations each having a radio that includes a power amplifier including foldback circuitry that monitors a current in said power amplifier indicative of actual uplink transmit power provided by said power amplifier to an antenna, said foldback circuitry operating to limit said monitored current to prevent said power amplifier from being driven over specification or being driven outside regulatory limits, and each operable to track incidents of foldback and to transmit a foldback event message whenever incidents of foldback tracked reach a predetermined threshold, an incident of foldback occurring whenever said foldback circuitry operates to limit said monitored current to prevent said power amplifier from being driven over specification or being driven outside regulatory limits; and a base station operable to receive foldback event messages and to maintain an estimated value for allowable maximum uplink transmit power for each said subscriber station, said base station decreasing said estimated value for a subscriber station when the base station receives a foldback event message from said subscriber station and increasing said estimated value for said subscriber station when a predetermined interval of time has lapsed without said base station receiving a further foldback event message from said subscriber station, said base station being configured to accurately estimate additional uplink transmit power currently available to said subscriber station by subtracting current transmit power reported by said subscriber station from said estimated value for said subscriber station.

12. The system of claim 11, wherein said base station adjusts estimated value in increments of substantially 1 dBm.

13. The system of claim 11, wherein said base station increases said estimated value for said subscriber station after a predetermined interval of time has lapsed without receiving a further foldback event message from said subscriber station.

14. The system of claim 13, wherein said predetermined period of time is substantially 30 minutes.

15. The system of claim 11, wherein said predetermined threshold is reached when a preselected number of consecutive frames have been subject to foldback.

16. The system of claim 11, wherein said predetermined threshold is reached when said subscriber station has a foldback duty cycle of more than a predetermined amount over a predetermined period of time.

* * * * *